United States Patent
Paulos

(10) Patent No.: US 9,914,535 B2
(45) Date of Patent: Mar. 13, 2018

(54) PASSIVE ROTOR CONTROL MECHANISM FOR MICRO AIR VEHICLES

(71) Applicant: The Trustees of The University of Pennsylvania, Philadelphia, PA (US)

(72) Inventor: James J. Paulos, Philadelphia, PA (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 0 days.

(21) Appl. No.: 14/772,579

(22) PCT Filed: Mar. 14, 2014

(86) PCT No.: PCT/US2014/027841
§ 371 (c)(1),
(2) Date: Sep. 3, 2015

(87) PCT Pub. No.: WO2014/160526
PCT Pub. Date: Oct. 2, 2014

(65) Prior Publication Data
US 2016/0001877 A1 Jan. 7, 2016

Related U.S. Application Data

(60) Provisional application No. 61/783,743, filed on Mar. 14, 2013.

(51) Int. Cl.
| | |
|---|---|
| *G01C 23/00* | (2006.01) |
| *B64C 27/12* | (2006.01) |
| *B64C 39/02* | (2006.01) |
| *B64C 27/48* | (2006.01) |
| *H02P 7/29* | (2016.01) |
| *B64C 27/39* | (2006.01) |
| *B64C 27/57* | (2006.01) |
| *B64C 27/00* | (2006.01) |

(52) U.S. Cl.
CPC .............. *B64C 27/12* (2013.01); *B64C 27/39* (2013.01); *B64C 27/48* (2013.01); *B64C 27/57* (2013.01);
(Continued)

(58) Field of Classification Search
CPC ....... B64C 17/12; B64C 27/48; B64C 39/028; B64C 2201/024; B64C 2201/042; H02P 7/29; H02P 2203/00
(Continued)

(56) References Cited

U.S. PATENT DOCUMENTS

| 5,214,364 A | * | 5/1993 | Perdue | G05B 19/408 318/600 |
|---|---|---|---|---|
| 5,259,729 A | * | 11/1993 | Fujihira | A63H 27/12 416/131 |

(Continued)

FOREIGN PATENT DOCUMENTS

| WO | WO 2005/087587 A1 | 9/2005 |
|---|---|---|
| WO | WO 2007/027550 A2 | 3/2007 |

OTHER PUBLICATIONS

"Letter Re: PCT Application No. WO2014160526", Christopher & Weisberg, P.A. Attorneys at Law, Feb. 9, 2015, 2 pages.

*Primary Examiner* — Shardul D Patel
(74) *Attorney, Agent, or Firm* — Baker & Hostetler LLP

(57) ABSTRACT

Technology for achieving the behavior and benefits of traditional cyclic control in one rotor may be implemented with a simple under-actuated passive mechanism. An air vehicle employing the disclosed technology maintains lifting thrust by regulating the average rotor speed and generates control moments through coordinated pulsing of the motor torque. Rapid pulsing of the motor torque induces oscillations in propeller angle of attack, and so causes "cyclic control" without requiring the traditional auxiliary actuators and linkages. The MAV propulsion system is capable of using a minimum number of actuators in dual roles of thrust and moment objectives.

14 Claims, 19 Drawing Sheets

(52) U.S. Cl.
CPC .............. *B64C 39/028* (2013.01); *H02P 7/29* (2013.01); *B64C 27/008* (2013.01); *B64C 2201/024* (2013.01); *B64C 2201/042* (2013.01); *B64C 2201/108* (2013.01); *H02P 2203/00* (2013.01)

(58) Field of Classification Search
USPC ........................................ 701/3, 16; 340/961
See application file for complete search history.

(56) References Cited

U.S. PATENT DOCUMENTS

| | | | |
|---|---|---|---|
| 6,382,556 B1* | 5/2002 | Pham | B64C 27/28 244/6 |
| 7,106,020 B1* | 9/2006 | McMillan | H02P 6/15 318/139 |
| 2004/0093130 A1* | 5/2004 | Osder | B64C 27/18 701/3 |
| 2005/0187677 A1* | 8/2005 | Walker | B64C 13/20 701/16 |
| 2006/0083167 A1* | 4/2006 | Balakrishnan | H04L 43/18 370/230 |
| 2010/0109581 A1* | 5/2010 | Sheahan, Jr. | B60L 7/14 318/376 |
| 2010/0187922 A1* | 7/2010 | Sheppard | H02K 3/47 310/59 |
| 2011/0143628 A1 | 6/2011 | Davis | |
| 2011/0177748 A1* | 7/2011 | Luo | A63H 27/12 446/57 |

* cited by examiner

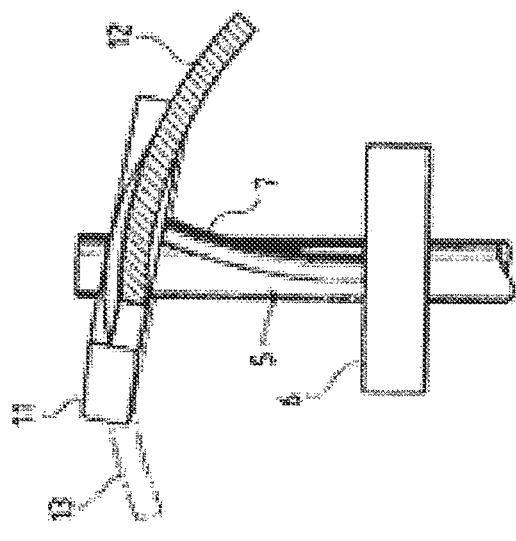
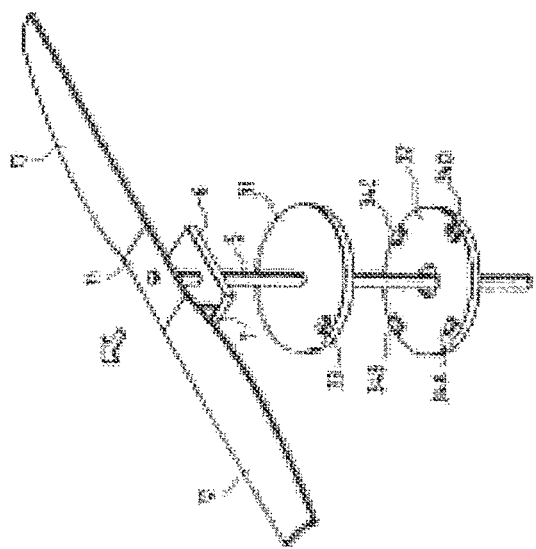
FIG. 3
PRIOR ART

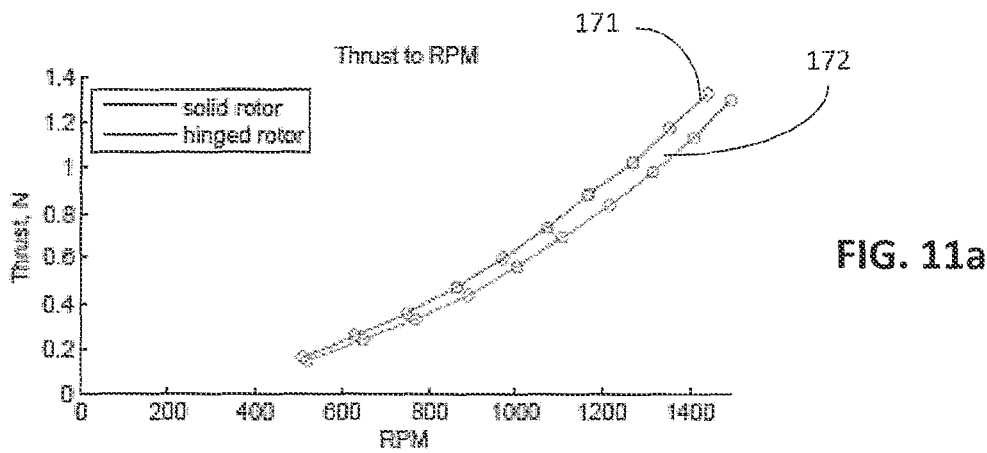
(a) thrust curve
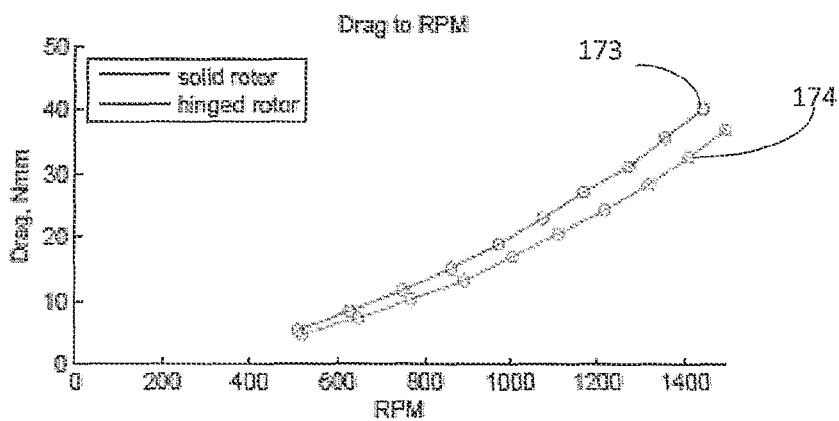
(b) drag curve
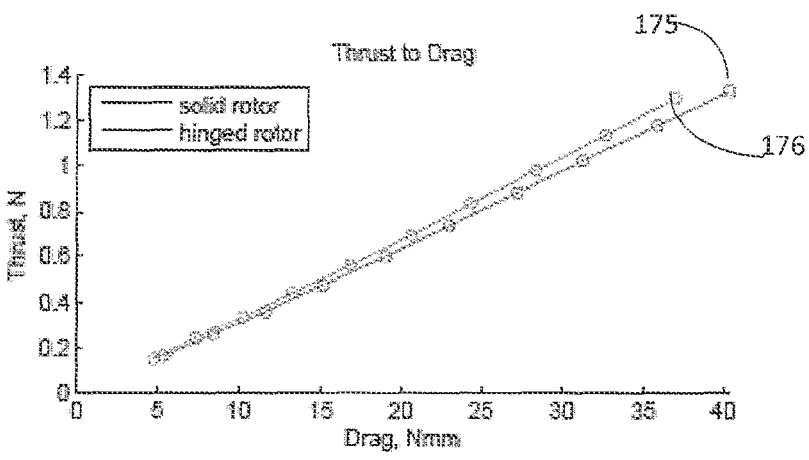
(c) thrust to drag (a) Three switching events in magnitude and phase.

(b) Highlight of step in amplitude.

(c) Highlight of step in phase.

PASSIVE ROTOR CONTROL MECHANISM FOR MICRO AIR VEHICLES

CROSS-REFERENCE TO RELATED APPLICATIONS

This application is the National Stage of International Application No. PCT/US2014/027841, filed Mar. 14, 2014, which claims the benefit of and priority to U.S. Provisional Application No. 61/783,743, filed Mar. 14, 2013, the entireties of which applications are incorporated herein by reference for any and all purposes.

TECHNICAL FIELD

The technical field generally relates to air vehicles and more specifically relates to a passive rotor control mechanism for achieving attitude control in micro air vehicles.

BACKGROUND

Contemporary small unmanned aerial vehicles (UAV) and micro air vehicles (MAV) generally fall into two classes: airplane-like craft optimized for cruising long distances, and helicopter-like craft optimized for hover and tight maneuvering. The class of hover-capable MAV is differentiated primarily by how attitude-correcting moments and forces are generated. Traditional helicopters employ auxiliary servo actuators and a complex swashplate mechanism to actively change the angle of attack of the main propeller through every revolution, a strategy referred to as 'cyclic control.' The cost and mechanical complexity of that traditional mechanism is one of the principle factors driving researchers towards "quadrotor" craft, which trade the one complicated propeller for four simple propellers.

An alternative to the complex swashplate mechanism is desired that offers similar capabilities but with fewer moving components. The invention addresses this and other needs in the art.

SUMMARY

An air vehicle employing the disclosed propeller strategy maintains lifting thrust by regulating the average rotor speed and generates control moments through coordinated pulsing of the motor torque. In an embodiment, a system includes a motor, a processor communicatively connected with a motor; and a memory communicatively coupled with the processor. The memory may have stored therein computer-readable instructions that, if executed by the processor, cause the processor to perform operations that include regulating an average speed of a rotor of an aerial vehicle to maintain lifting thrust and pulsing of a torque of the motor of the aerial vehicle to generate control moments.

In another embodiment, an aerial vehicle may include a hub, a motor, a shaft connected with the motor and the hub, and a rotor. The motor shaft may transmit torque to the rotor so that the torque of the motor is pulsed to generate control moments for the aerial vehicle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3 is an illustration of a control system from U.S. Pat. No. 5,259,729;

FIG. 11a shows a thrust to RPM performance comparison of geometrically similar hinged and rigid hub propellers;

FIG. 11b shows a drag to RPM performance comparison of geometrically similar hinged and rigid hub propellers;

FIG. 11c shows a thrust to drag performance comparison of geometrically similar hinged and rigid hub propellers;

DETAILED DESCRIPTION OF ILLUSTRATIVE EMBODIMENTS

Figure 1:
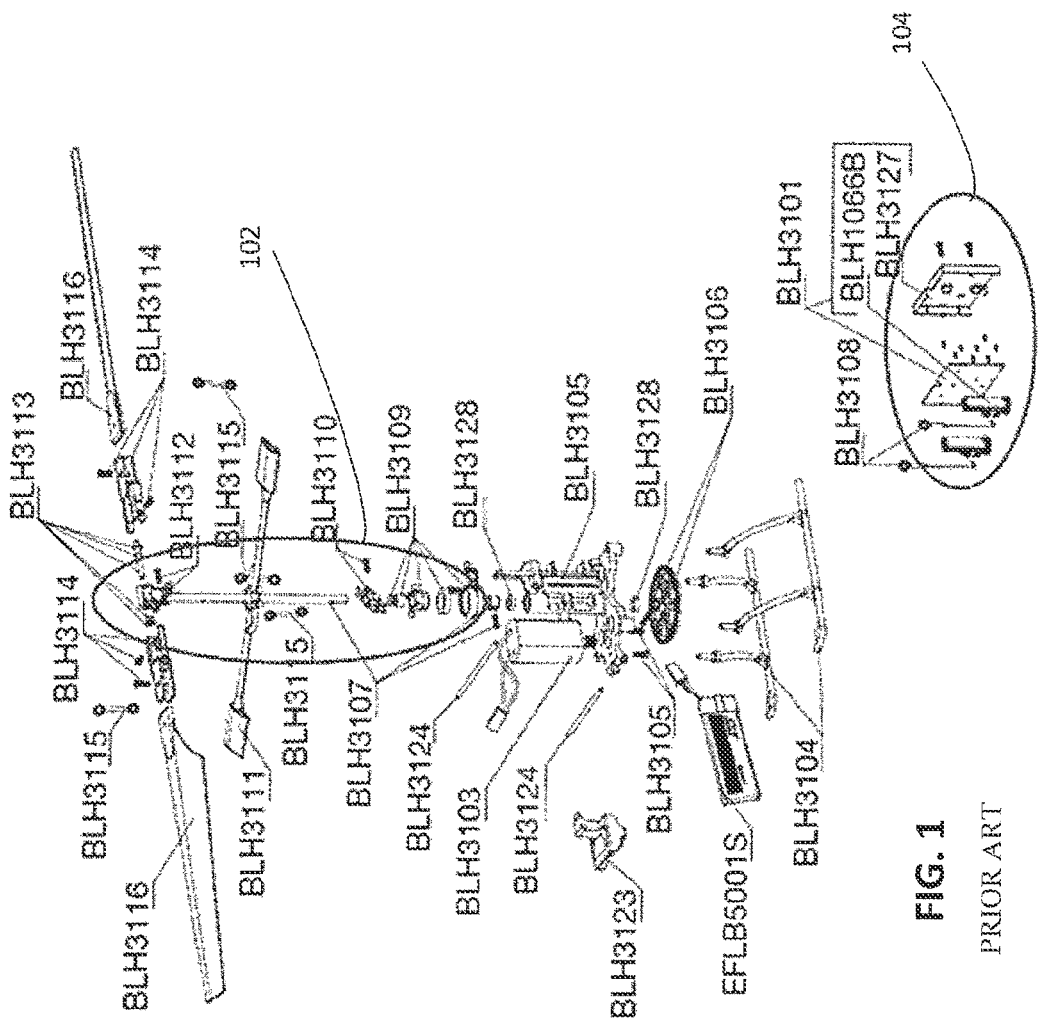
FIG. 1 is an exemplary illustration of a portion of an air vehicle comprising traditional swashplate elements.

Traditional helicopters employ auxiliary servo actuators and a complex swashplate mechanism to actively change the angle of attack of the main propeller through every revolution, a strategy referred to as 'cyclic control.' FIG. 1 is an exemplary illustration of portions of an air vehicle that include a swashplate. Oval 102 and oval 104 comprise swashplate elements that may include approximately 20 parts. Disclosed is a technology for achieving the behavior and benefits of traditional cyclic control in one rotor with an under-actuated passive mechanism for air vehicles.

A brief review of some terms used herein. A rotor and a propeller are used synonymously herein. A rotor/propeller typically refers to the bulk device. A rotor blade and a propeller bade are used synonymously herein. A rotor blade/ refers to just one of the aerodynamic elements, as in the "positive rotor blade" on one side versus the "negative rotor blade" on the other side. Axis of rotation and central shaft are used synonymously herein. This refers to the imaginary line about which the rotor rotates. The motor shaft is the physical component usually aligned with the axis of rotation. The terms "angle of attack" and "blade pitch" are not synonymous, but are closely related concepts.

As background, traditional helicopter design has been informed by the assumption that large thrust actuators have slow characteristic response, necessitating separate actuators and a complex linkage system for high bandwidth control. Premium hobby helicopter models typically incorporate a full swashplate system much like traditional full size helicopters. Toy models may omit the swashplate and instead use additional miniature propellers to weakly push or tilt the helicopter to travel. In contrast, four-rotor "quadrotor" flight systems coordinate multiple identical rotors to achieve both thrust and moment objectives. Finally, some efforts have been made to achieve both thrust and moment response from a single actuator using indirect drive through a linkage. The contributions discussed herein are towards an original realization, analysis, and validation of a MAV propulsion system capable of using a minimal number of actuators in dual roles.

Helicopters typically have one main power plant and lifting rotor along with a separate tail rotor to control yaw and two separate servo actuators to control moments in pitch and roll. Medium scale platforms of this type with rotor diameters of approximately one meter can be agile in the hands of expert pilots or autonomous control. A modification of the traditional helicopter is to forego the tail rotor in favor of two counter-rotating, coaxial main rotors. This format has found some favor for small scale applications, most notably for the European muFly project. In both single-rotor and coaxial helicopter formats the aerodynamic control moments about pitch and roll are generated by actively changing the pitch of the rotor blade as it rotates through the use of auxiliary servos. Varying angle of attack, locked in phase with the rotor rotation, results in an asymmetric distribution of lift across the effective rotor disk and generates control moments felt by the helicopter body. The amount of cyclic pitch oscillation and its phasing relative to the body of the helicopter is usually controlled by dedicated roll and pitch servos through a swashplate linkage. This complex mechanical linkage allows steady set points from relatively low bandwidth actuators to control the amplitude and phase of the cyclic oscillation at rotor frequencies in excess of 16 Hz.

Several variations of the cyclic enabled rotor are in use, each requiring slightly different modeling assumptions. A choice for small scale craft is to consider the rotor blades as rigid structures attached to a hub at their base with actuated freedom about their long axis (pitch variation or feather), but no rotational freedom about their base either upwards out of the rotor plane (flap) or sideways within the rotor frame (lead/lag). Time average moments $M_\phi$ and $M_\theta$ about the body x and y axis in response to a cyclic command $\theta_{cyc}$ can be computed by integrating aerodynamic forces on the rotor blade. In some models, a differential element of lift $d_L$ at a station radius r along a helicopter blade may be calculated from the air density ρ, blade chord c, local incident velocity ωr due to rotation rate ω and local radius r, lift curve slope constant a, and control input $\theta_{cyc}$.

$$dL_m = \frac{1}{2}\rho c(\Omega r)^2 a\theta_{cyc} \quad (1)$$

This differential element of lift is multiplied by the local radius vector to find the differential contribution to the aerodynamic moment, and then is integrated along the length of the rotor blade and around one revolution of the propeller to yield an effective actuator disk control moment. The calculation of aerodynamic forcing for any other variant of cyclic pitch control systems will follow very similarly.

In large aerial vehicles cyclic pitch control allows for a strict dichotomy between thrust and control generating actuators. This permits the separate optimization of lifting engines with high power and slow response times and servo control actuators that have high frequency response. As an aerial vehicle is scaled down (e.g., MAV) the complexity and bulk of the swashplate is of increased significance. This was ultimately one of the key technical challenges driving the mechanical design of the Draper coaxial helicopter developed as part of the DARPA Nano Air Vehicle (NAV) initiative.

The quadrotor platform has had high profile success which has led to several attempts to commodify the technology for the hobby market. Generally, these devices employ simple rigid rotors and dispense with the passive stability mechanisms such as teetering rotors and flybars that are typical in single rotor helicopters. By employing four simple, independently controlled rotors these devices eliminate the need for the swashplate control mechanism and its associated segmentation of thrust and moment control actuation.

Figure 2:
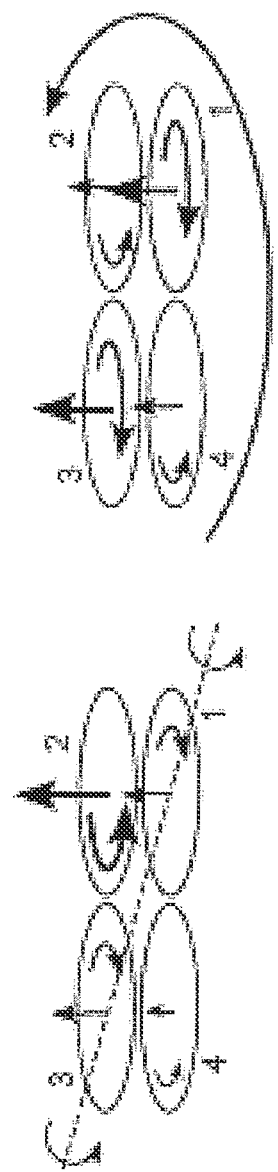
FIG. 2 is an exemplary illustration of quadrotor control moments generated by differential lift and drag.

A typical quadrotor employs four similar rotors arranged symmetrically about the body and collocated in the plane, as illustrated in FIG. 2. The two opposing pairs of rotors are matched sets, one pair spinning clockwise and the other pair counterclockwise. The net thrust of the four rotors generates lift, and simple combinations of controls to the four rotors can produce general moments about the body axis. Increasing the speed of the clockwise set of rotors, while decreasing the speed of the counterclockwise set generates a yaw moment due to drag imbalance without exciting a roll response. Similarly, increasing the speed of one member of a pair while appropriately decreasing the speed of its mate generates a roll moment about the perpendicular axis without exciting a yaw response. In both cases, the net thrust can remain unchanged.

Through combinations of inputs the quadrotor utilizes four identical actuators in the mixed roll of thrust and control. However, these craft still require four actuators, similar to the two rotor motors and two servos of a traditional coaxial helicopter. The robotics community has embraced the quadrotor format because its operational principles are consistent with relatively simple, useful models and the devices themselves are moderately robust and reparable. This simplicity does not reduce the number of actuators needed to fly, however, and increased power consumption may be associated with the added structure required to hold four distributed rotors and the increased mass associated with segmentation of the power plant.

U.S. Pat. No. 5,259,729 to Fujihira et. al. (hereinafter Fujihira) describes an alternative method for achieving control moments in a helicopter through modulation of a single main motor. In this embodiment, opposing blades of the single rotor are fused and may rotate together about their common long axis, a motion that results in complementary increasing and decreasing pitches for the two blades. The propeller is not rigidly fixed to a drive shaft, but is rather driven indirectly by a short, flexible connecting rod a small distance out from the center of rotation. The geometry of this connection is such that the motor torque driving the rotation through this off-center linkage necessarily exerts an additional torque about the free long axis of the blade, as illustrated in FIG. 3, which is from the U.S. patent. As a result, high frequency pulses in motor torque at the frequency of the propeller rotation induce oscillations in blade pitch, mimicking the action of cyclic pitch control normally associated with swashplate systems.

The Fujihira device makes multi-modal use of its main actuator by mechanically enabling a large degree of separation between the low frequency signal component driving propeller speed and thrust and the high frequency component driving blade pitch oscillations and body moments. Fujihira has much of the mechanical complexity of a swashplate, including the need to support the propeller free to feather about the long axis and the exacting geometry of the linkage between the motor drive plate and propeller.

Herein, a pulsing rotor control method is proposed which is capable of expressing controlled cyclic variation in pitch without auxiliary actuators or external linkages. Micro air vehicles (MAV) employing the disclosed propeller strategy maintains lifting thrust by regulating the average rotor speed and generates control moments through coordinated pulsing of the motor torque. Rapid pulsing of the motor torque induces oscillations in propeller angle of attack, and so causes "cyclic control" without requiring the traditional auxiliary actuators and linkages. Control moments are generated through coordinated pulsing of the motor torque and the desired thrust is separately maintained by the mean torque value driving the rotor speed.

Figure 4:
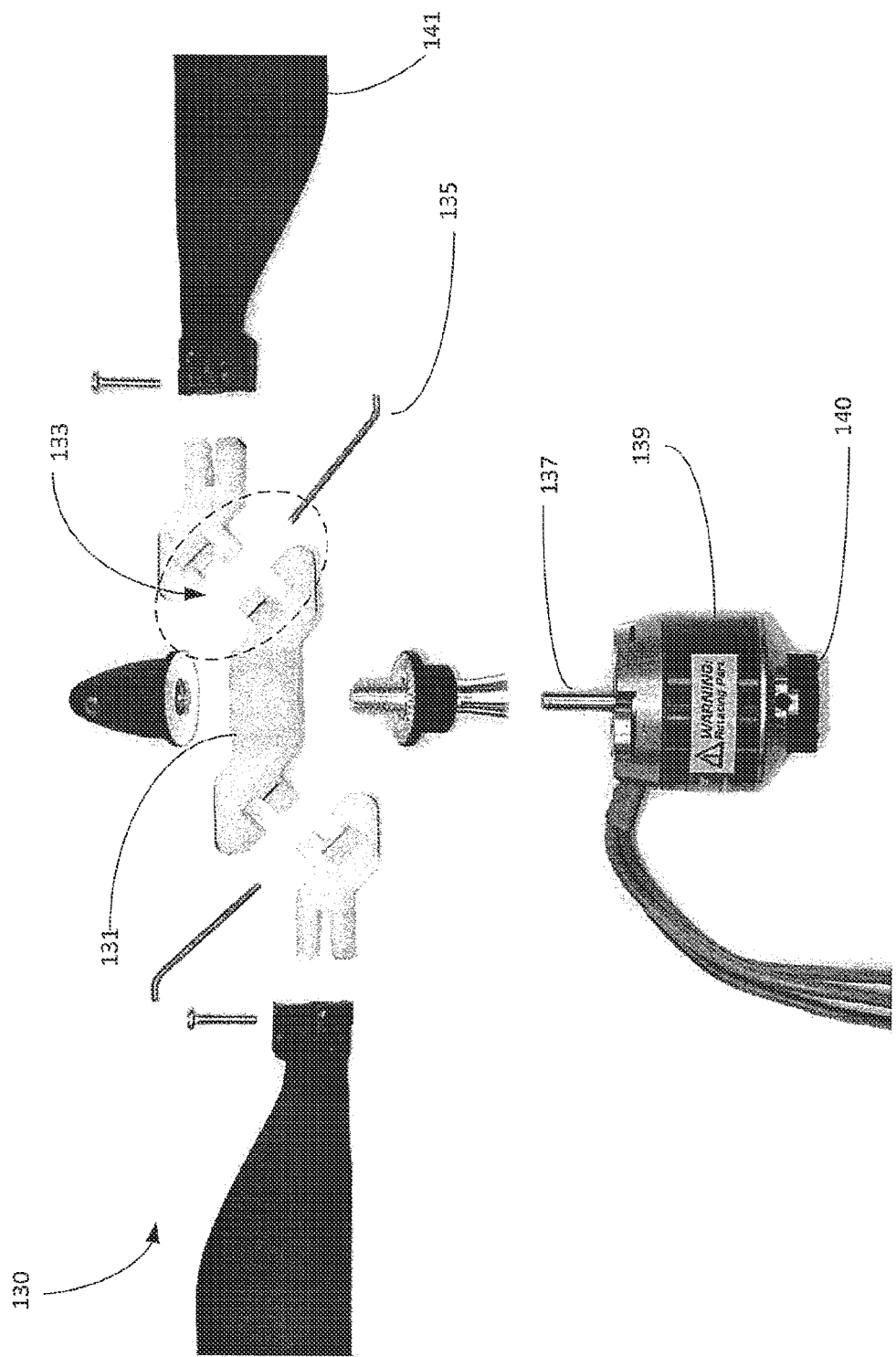
FIG. 4 illustrates components of an air vehicle that may be used to implement a passive rotor control mechanism.
Figure 5:
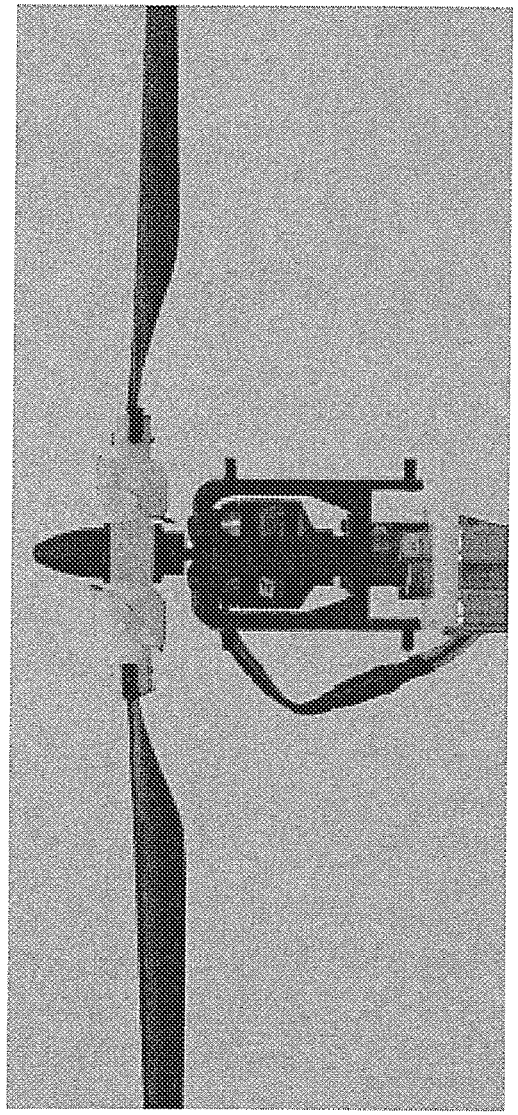
FIG. 5 illustrates a motor housing mounted to a small load cell and supported out of ground effect on an aluminum pylon.

FIG. 4 illustrates separated components 130 of an air vehicle that may be used to implement a passive rotor control mechanism. Air vehicle components 130 includes hub 131, hinge 133, hinge pin 135, propeller blade 141, motor shaft 137, motor 139, and magnet 140, among other things. Magnet 140 may be used for a rotation sensor. FIG. 5 is a motor housing mounted to a small load cell and supported out of ground effect on an aluminum pylon. FIG. 5 illustrates what the components shown in FIG. 4 may look like when assembled.

Figure 6:
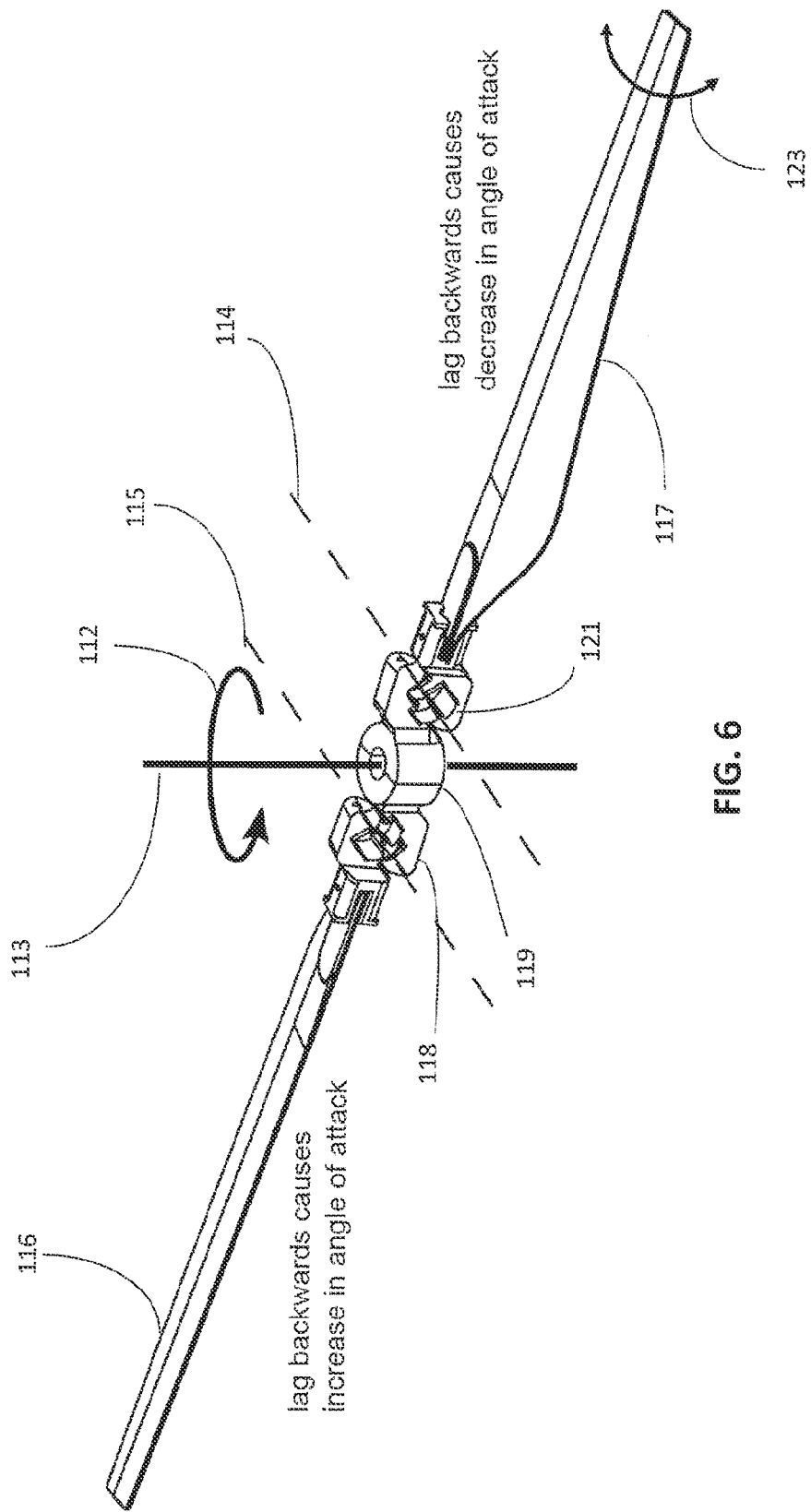
FIG. 6 is an exemplary illustration of a hinged rotor for cyclic pitch control through torque modulation.

FIG. 6 is an exemplary illustration of a hinged rotor for cyclic pitch control through torque modulation. Positive rotor blade 116 is connected with hinge 118. Hinge 118 has an axis represented by line 115. Negative rotor blade 117 is connected with hinge 121. Hinge 121 has an axis represented by line 114. Pitch rotation of negative rotor blade 117 is indicated by line 123. Hinge 118 and hinge 121 are connected with hub 119. Hub 119 has an axis of rotation 113, which has a direction of rotation 112.

Figure 7:
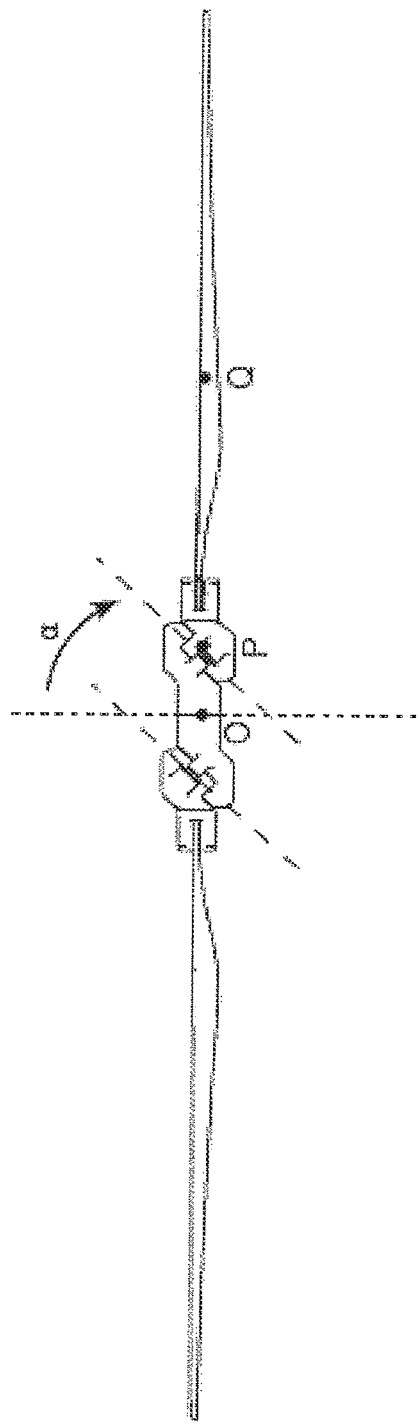
FIG. 7 is an exemplary illustration of a hinged rotor with points of the simplified geometry.

In an embodiment, hub 119 (e.g., a hub that is centrally located in the air vehicle) is rigidly connected with a motor shaft (not shown) that runs along axis of rotation 113 and transmits torque to the rotor. Axis line 115 corresponding to hinge 118 and the axis line 114 corresponding to hinge 121 may lie parallel and co-planar to each other and co-planar to hub 119 axis of rotation 113. Positive rotor blade 116 may have the top of its hinge (i.e., hinge 118) inclined towards the motor shaft by an angle α (e.g., angle α in FIG. 7). The motor (not shown) may apply an impulsive forward torque to hub 119 in the direction of rotation 112. Positive rotor blade 116 may then rotate backwards on hinge 118 relative to the forward rotation of hub 119 due to the inertia of positive rotor blade 116. The orientation of hinge 118 causes this motion to increase the angle of attack of rotor blade 116. Similarly, a retrograde torque may instead flex positive rotor blade 116 forwards about hinge 118 and decrease the blade angle of attack. The complementary negative rotor blade 117 has the opposite response to torques due to the complementary axis geometry. As a result, there is a net positive balance of lift on the side of positive rotor blade 116 when hub 119 is accelerating and a net negative balance of lift on the side of positive rotor blade 116 when hub 119 is decelerating. A sinusoidal driving torque in phase with the rotor rotation may cause each rotor blade (positive rotor blade 116 and negative rotor blade 117) to have increased angle of attack as it rotates around the front of the aircraft on every revolution and decreased angle of attack as each rotor blade rotates around the back of the aircraft on every revolution. The resulting average lift imbalance, fore and after, results in a useful attitude control moment. Such a control moment may be obtained in any direction and may be used to either pitch or roll the aircraft.

In another embodiment, the hinge lines (e.g., hinge line 115 and hinge line 114) could instead be skewed out of the plane to affect a coupling between lead-lag (forward-backward) and flap (up-down) motions, which also induces changes in aerodynamic angle of attack. There is also no strict requirement that the hinge axes be parallel or symmetric to each other. In another embodiment, the addition of a flapping (up-and-down) hinge or flexure near hub 119 may reduce unwanted vibrations being transferred to the vehicle body. Such a hinge may be placed in addition to hinge 118 either between hub 119 and hinge 118 or between hinge 118 and positive rotor blade 116, and another may be placed similarly near hinge 121.

With reference to the design of FIG. 6, FIG. 4, FIG. 5, and embodiment discussed herein, a pulsing rotor torque creates cyclic pitch variations very similar to those generated by a swashplate and servo actuators. By changing the magnitude of the driving sinusoidal modulation the magnitude of the control moment is adjusted, and by changing the phase of the signal relative to the airframe the direction of the control moment in the pitch and roll plane is affected. A vehicle may optionally gain authority over yaw by pairing this pulsing rotor with a traditional helicopter tail rotor or by adopting a coaxial rotor configuration. In such cases, the resulting two-actuator system achieves the similar degrees of control freedom as either a traditional four actuator helicopter or four rotor quadrotor.

A physical realization of the proposed propeller system was constructed for testing. In an embodiment, the drive motor was a 12-pole, 740 Kv brushless motor. This motor was appropriate for driving the large, slow rotors associated with helicopter systems without a gearbox due to its low Kv constant, expressing rotor revolutions per minute (RPM) per volt motor EMF. The three part propeller hub was manufactured from a plastic polymer. The fixed hub interfaces with the motor shaft using a standard aluminum mounting mandrel, and then two plastic blade clamps interface with the central hub along steel wire hinges. The aerodynamic element of each rotor was a commercial propeller blade, which was modified to interface with the custom rotor clamps. The chosen blades resulted in a rotor disk diameter of 39 cm and are specified for operation at around 1000 rpm and 1 N of thrust.

Cyclic control of the motor torque may be implemented with knowledge of the absolute rotor position—information not available from off the shelf brushless motor controllers designed for flight systems. Computation inside the inner control loop is used to synthesize the appropriate high frequency modulated commands from an autopilot's thrust and moment requests. A high performance brushless motor controller may be used that fulfills both thrust and moment requests while also providing additional bidirectional communication and diagnostic capabilities useful in experimental evaluation. In an embodiment, the use of the motor controller may involve mounting an external Hall effect sensor which resolves the rotor position to $1/4096$ of a revolution, or less than 0.1 degrees. In the embodiment, as shown in FIG. 4, a magnet (e.g., magnet 140) is attached to the bottom of the motor and the magnet spins when the motor is activated. A stationary Hall Effect sensor is attached to the airframe. The orientation of the magnet is measured in order to measure the orientation of the rotor. This is an example of a direct measurement using a high-resolution magnetic encoder.

There are several ways to estimate the position of the rotor. In an embodiment, a brushless motor controller without attached sensor may be sufficient. Brushless motor controllers may be configured to estimate the motor position in order to do its electric commutation and along the same lines may be used to estimate the position of a rotor. In another embodiment, one could interpolate between once-per-revolution indexes from a cheap mechanical, optical, or magnetic device using timing or the known motor commutation speed. Alternatively, the rotor position could be estimated with no additional sensors through an observer algorithm working on the measured vehicle motion and commanded attitude corrections.

The dynamics of the proposed hinged propeller determine the sensitivity of pitch oscillations and the corresponding body moments to high frequency components of the applied torque. It is instructive to understand the role various physical design parameters play in determining the system behavior, among them the inclination angle of the hinges. A full model of the system usually incorporates linkage kinematics, solid body dynamics, and the aerodynamic forcing. This modeling effort discussed herein focuses on the kinematics and solid body dynamics, as the response of pitch oscillations to input torque is instructive even in the absence of aerodynamic forcing.

Figure 8:
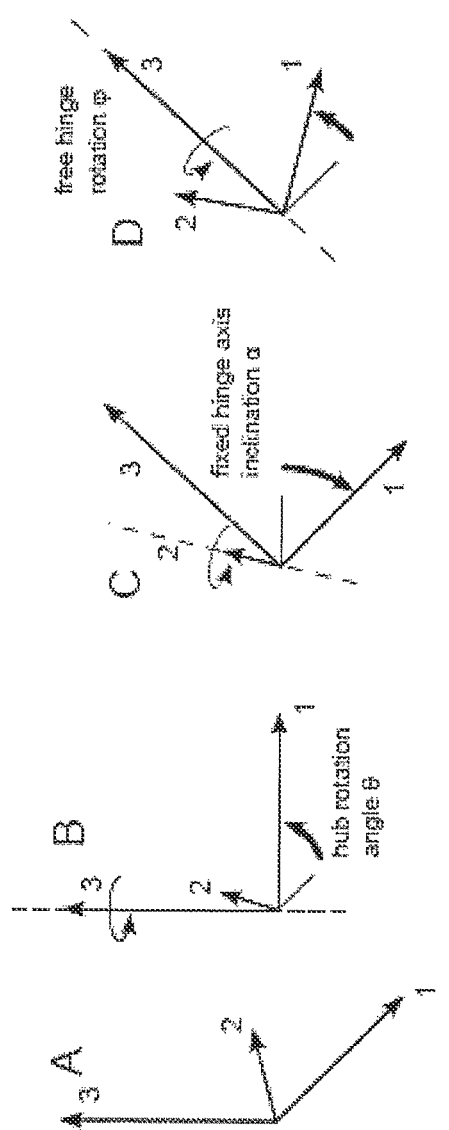
FIG. 8 is an exemplary illustration of a series of coordinate frames.

The kinematic model for the proposed propeller consists of the hub and two blades, with these three solid bodies connected by two hinges. One blade will be considered here as the analysis of the anti-symmetric partner may similarly follow. Points in the simplified geometry shown in FIG. 7 include inertially fixed O on the motor axis, point P lying on the hinge axis, and point Q located at the blade center of mass. It will be also useful to consider a series of coordinate frames and axis associated by simple rotations, and these are illustrated in FIG. 8. The inertial frame A lies with axis $a_3$ aligned with the hub axis of rotation. A hub-fixed frame B is found by rotating A about $a_3$ through angle $\theta$ such that $b_1$ points radially towards the hinge point. The hinge frame C is found by a rotation from B about axis $b_2$ by fixed angle $\alpha$, bringing $b_3$ to $c_3$, pointing along the hinge line. Finally, the blade-fixed frame D is found by a rotation about $c_3$ by angle $\phi$, bringing $c_1$ to $d_1$.

Equations of motion are derived using Lagrange's equation. The kinetic energy of the system is first calculated. The model then incorporates an external forcing torque on the hub and forces between the hub and blade due to torsional spring and damper terms at the hinge. Lagrange's equations for this holonomic system yield ordinary differential equations for $\theta$ and $\phi$ in terms of the generalized speeds $\theta^\cdot$ and $\phi^\cdot$ and the generalized forces $Q_\theta$ and $Q_\phi$. The driving motor torque at the hub $\tau$ is the generalized force $Q_\theta=\tau$ and the hinge spring stiffness and damping appear in the generalized force $Q_\phi=-k\phi-c\phi^\cdot$.

Numerical simulation of the half rotor system shows that a sinusoidal input torque locked to the hub rotation couples into a phase locked oscillation in the hinge angle. This oscillation in angle of attack is the desired effect that would cause net aerodynamic moments in the physical system. A fixed test stand was developed to allow for the open loop propeller response to be evaluated experimentally in a controlled environment. The motor was housed in a custom 3D printed bracket, which also constrains the rotor position sensor. The propeller assembly component (e.g., as shown in FIG. 4) was attached to the output shaft of the motor. The housing was mounted to a six degree of measurement force and torque sensor, which was then rigidly attached to the pylon of an aluminum test stand, as show in FIG. 5.

Test data was accumulated from both the motor controller's own state reports and data from the force torque sensor holding the motor module. A Force/Torque sensor sent analog signals to a 12-bit NI DAQ sampling at 20 kHz. A Matlab code interpreted the six strain gauge channels to calculate the forces in three directions and moments about three axes imposed on the face of the sensor. This system can resolve $1/320$N of force and $1/64$ Nmm torque and is well suited for this application, where a typical thrust force may be 1 N and typical drag force 30 Nmm. Prior to each test the sensor was zeroed to adjust for variations in cable strain or the rotor configuration. The Matlab test script also captured the motor controller's own measurements of rotor position and speed at 500 Hz, along with the instantaneous command pulse width. Tests were conducted from a power supply at 7.4 V and manual measurements of current were recorded from a digital multimeter.

Figure 9:
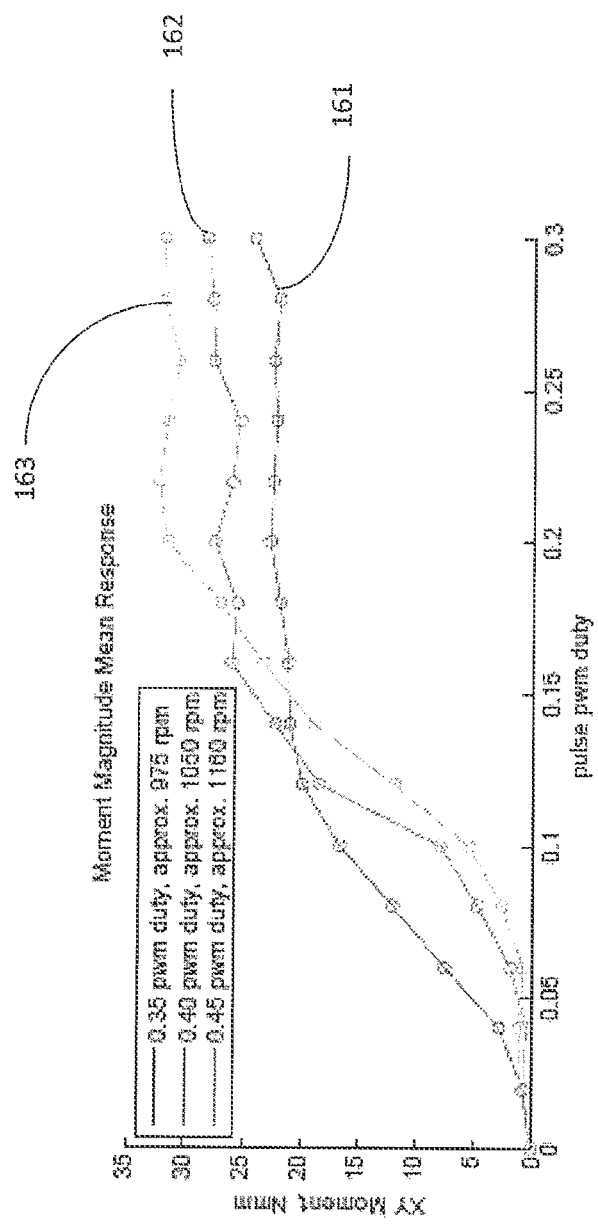
FIG. 9 shows the net control moment response magnitude.

The rotor system, as an actuator, maps input signal to generated moment. To characterize the relationship, the rotor was driven to a steady nominal operating condition and then oscillatory control applied across a range of drive amplitudes. The time averaged moment response amplitudes were calculated and were plotted against the corresponding input amplitude in FIG. 9. In FIG. 9, 0.35 pwm corresponds with line 161, 0.40 pwm corresponds with line 162, and 0.45 pwm duty corresponds with line 163. This test was conducted at three different rotor speeds to detect changes in sensitivity due to varying thrust requirements. Taking 1050 rpm as a baseline operating condition, these tests span approximately 80% to 115% of nominal thrust.

Figure 10:
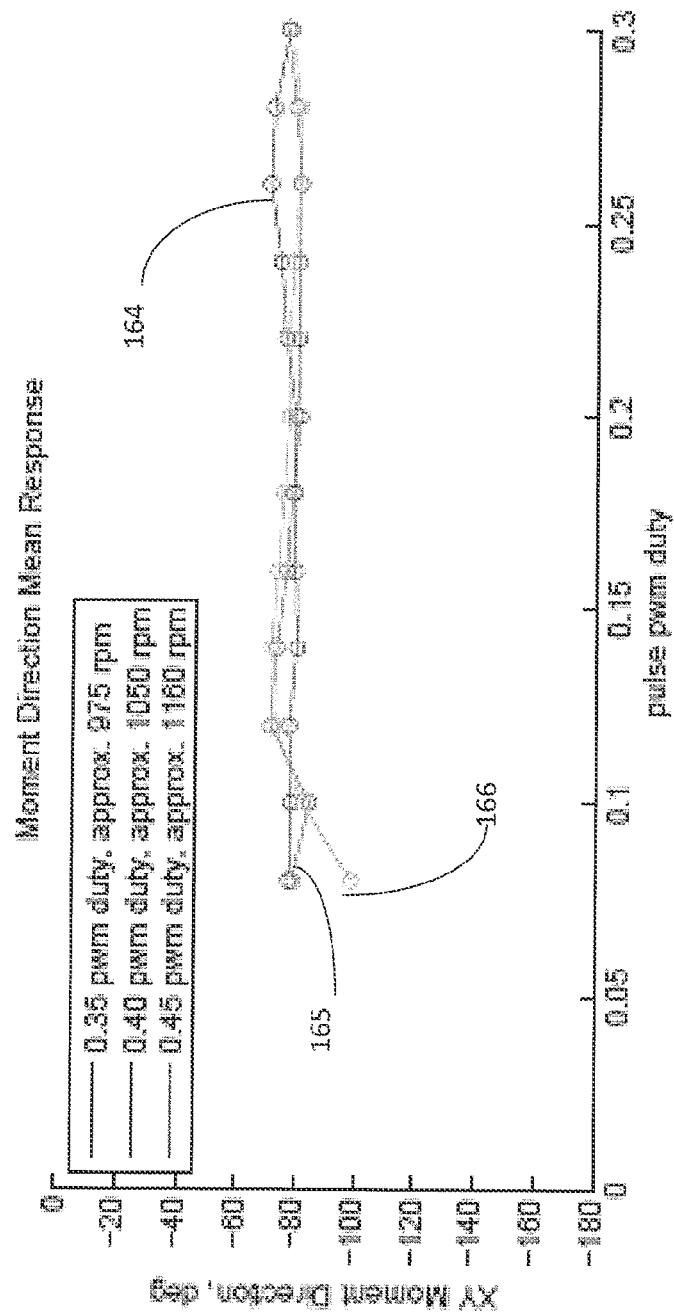
FIG. 10 shows the net control moment response direction.

Each sensitivity curve displays a cut-in threshold below which no meaningful control moment is generated, then a region of roughly linear growth in generated moment, and finally a plateauing where increasing signal amplitude no longer generates increasing moments. Comparing across curves of different rotor speeds, the slope of the linear regions appears similar, but at higher speeds the cut-in input strength is higher and the ultimate attainable control moment is also elevated. The relative phase between the input signal and output moment appears to be relatively insensitive to both rotor speed and excitation magnitude within this small range of normal operation. FIG. 10 illustrates that the net control moment response direction remains fixed for a fixed excitation phase, independent of excitation amplitude. In FIG. 10, 0.35 pwm corresponds with line 164, 0.40 pwm corresponds with line 165, and 0.45 pwm duty corresponds with line 166. The control sensitivity testing indicates that a maximum control moment of 30 Nmm is available from the 39 cm rotor, with a net mechanical system mass of 80 grams.

Achieving useful flight duration is a challenge in micro aerial vehicles due to their high power requirements and generally low capacity for onboard energy storage. Flight efficiency for lifting rotor craft is predominately dependent on the lift and drag characteristics of the main rotor. The performance of the hinged propeller was compared to a geometrically similar rigid propeller by recording lift and drag across a range of rotor speeds. For the hinged rotor in steady state the drag forces bend both blades backwards slightly at their hinges, increasing the angle of attack on one side and decreasing the angle of attack on the other. The range of operating speeds for a helicopter rotor is small, and so it would be possible to anticipate this degree of deflection and design the rotors to assume their optimal angle of attack in the hover condition. Both the hinged and rigid rotor assume the same blade geometry with the hinges aligned neutrally, but as the drag forces adjust the trim of the hinged blade the hinged blade adopts a less aggressive angle of attack causing drag to decrease and lift to drag ratios to increase. FIG. 11a illustrates a thrust to RPM performance comparison of geometrically similar hinged and rigid hub propellers. In FIG. 11a, line 171 corresponds with a solid rotor and line 172 corresponds with a hinged rotor. FIG. 11b illustrates a drag to RPM performance comparison of geometrically similar hinged and rigid hub propellers. In FIG. 11b, line 173 corresponds with a solid rotor and line 172 corresponds with a hinged rotor. FIG. 11c illustrates a thrust to drag performance comparison of geometrically similar hinged and rigid hub propellers In FIG. 11c, line 175 corresponds with a solid rotor and line 176 correspond with a hinged rotor.

An instructive performance metric for lifting rotors is the figure of merit, defined as the ideal power divided by the actuator power for a given thrust and incident flow velocity. The actuator mechanical shaft power on the test stand $P_{meas}$ is given by the product of the applied torque and the rotor shaft speed. The ideal power $P_{id}$ is derived from momentum theory by solving for the momentum balance in a control volume around the idealized actuator disk. The ideal power at hover is dependent on the thrust T, air density ρ, and rotor radius r, and this value is used to calculate the figure of merit FM.

$$P_{meas} = M * w \quad (2)$$

$$P_{id} = \frac{T^{\frac{3}{2}}}{\sqrt{2\rho\pi r^2}} \quad (3)$$

$$FM = \frac{P_{id}}{P_{meas}} \quad (4)$$

Figure 12:
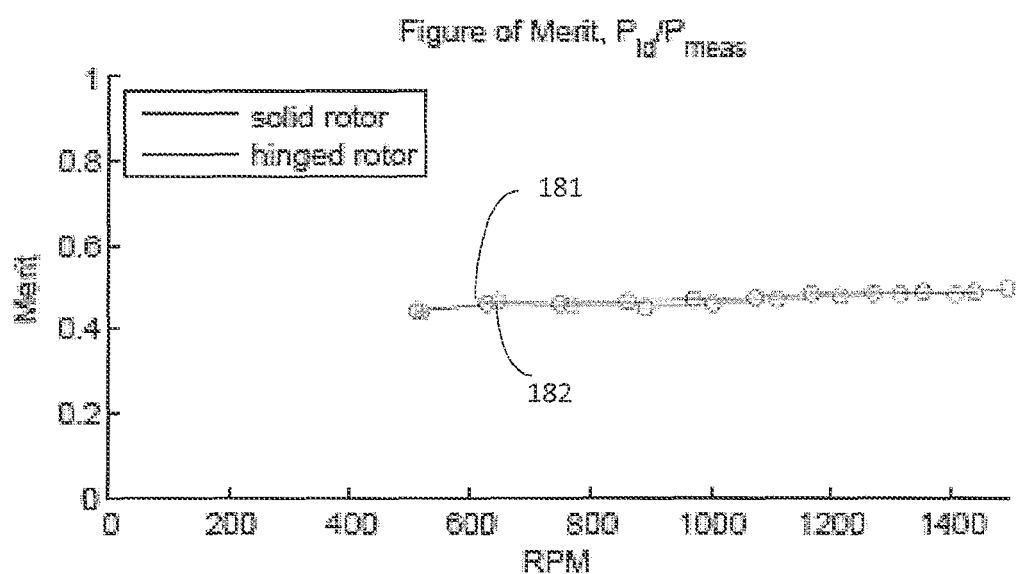
FIG. 12 shows figure of merit for geometrically similar hinged and rigid hub propellers.

The figure of merit for both the hinged propeller system and the geometrically similar fixed hub propeller are compared in FIG. 12 across a range of operating conditions. The figure of merit calculation shows that the power efficiency of the hinged blade sample is a few percent worse than its fixed hub counterpart over most of the operational envelope. In FIG. 12, line 181 corresponds to the solid rotor and line 182 corresponds to the hinged rotor. It may seem surprising that the thrust to drag ratio is not a proxy for energy efficiency, but the thrust curve showed that the hinged blade spins faster than the fixed propeller for equivalent thrust, and this contributes to the greater shaft power required. These results inform future iteration on the zero deflection angle of attack for the blade clamps.

For a steady modulation phase and magnitude the rotor system is intended to produce a mean time average moment in pitch and roll. A time record of the forces and moments exerted by the rotor system shows the oscillations about this mean value as the rotor blade rotates through space. As shown in mathematical models, each blade will undergo one oscillation in angle of attack for each revolution of the propeller. The blades have parallel hinge axis inclinations such that when one blade has reached its maximum angle of attack the opposing blade on the other side of the rotor disk is experiencing its minimum angle of attack. As a result, the moment response about a selected axis of excitation displays two maxima per revolution (one for each blade). In addition to this behavior, two un-modeled phenomena are present in the data.

Figure 13A:
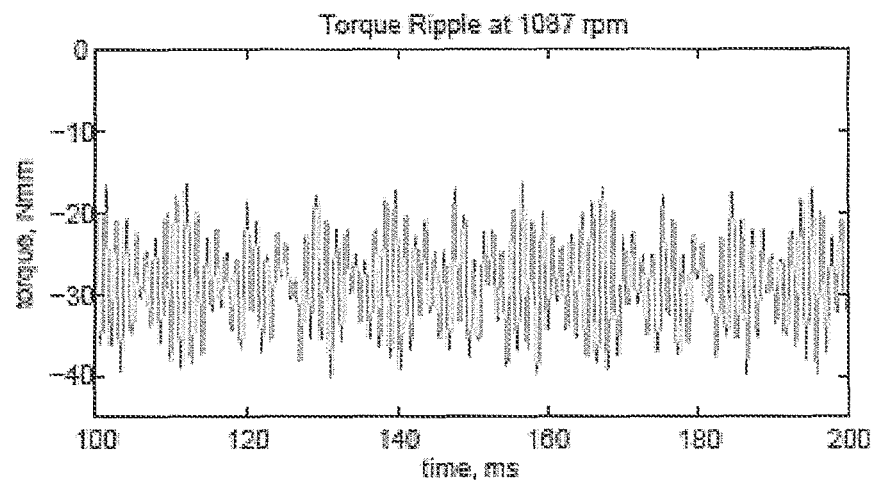
FIG. 13a shows torque ripple measures with the hinged rotor at 1087 rpm.
Figure 13B:
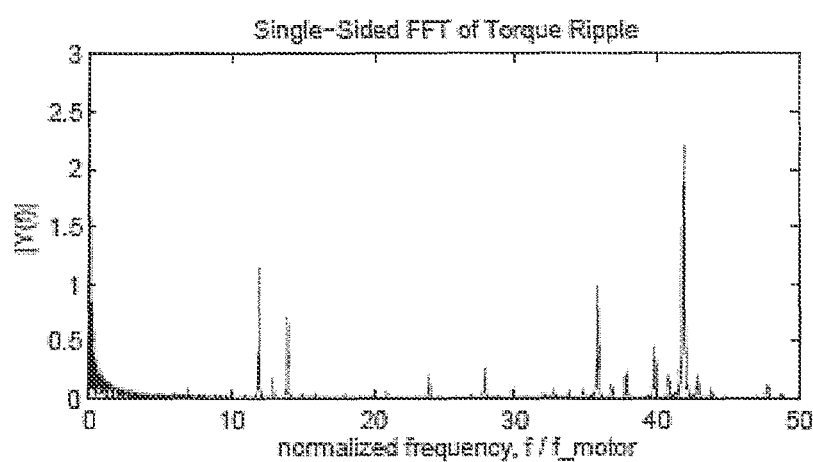
FIG. 13b shows single-sided FFT of torque ripple.

A time history of the measured axial torque shows large, high frequency fluctuations even when the propeller is running at a steady state with no forced oscillation in input. The amplitude of this fluctuation is non-negligible when compared to the steady drag torque loading the motor at 1087 rpm, as shown in FIG. 13a. These fluctuations are primarily associated with the passive cogging of the rotor which can be detected by touch even when the motor is electrically disconnected. The torque ripple peak-to-peak measure shown in FIG. 13a is more than ⅓ the mean value. FIG. 13b shows single-sided FFT of torque ripple. The FFT shown in FIG. 13b highlights multiples of 12 and 14 times the rotor frequency.

Figure 14:
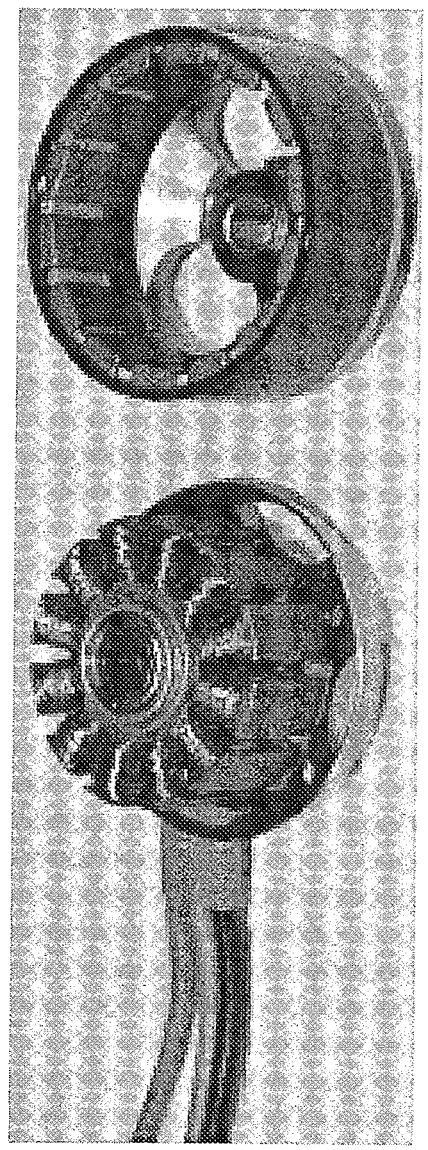
FIG. 14 is an exemplary 'outrunner' brushless motor that has 12 stationary coils on the inner ring and 14 magnets on the external, moving housing.
Figure 15:
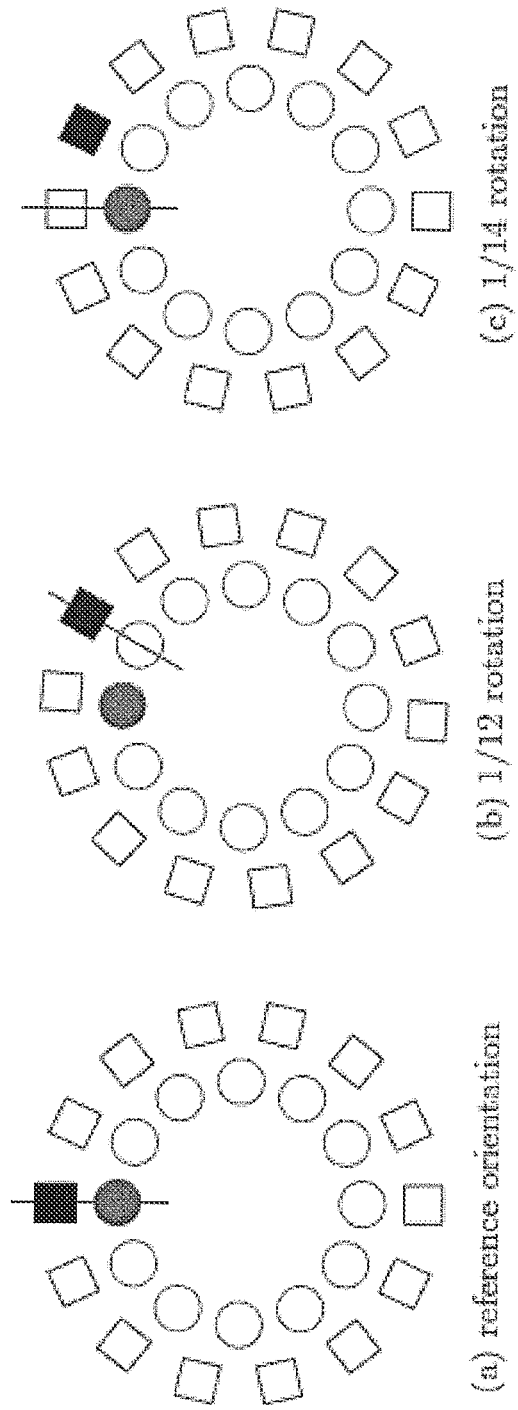
FIG. 15 is an exemplary illustration of equivalent coil-magnet relative configurations.

The details of the cogging torque fluctuations depend on the exact geometry of the magnets and iron winding cores and their mutual magnetic attraction, but the fundamental periodicities can be understood as arising from symmetries in the motor of FIG. 14. FIG. 14 illustrates the 'outrunner' brushless motors which has 12 stationary coils on the inner ring and 14 magnets on the external, moving housing. If the 12 internal stator coils have 12 part symmetry and the 14 external rotor magnets have 14 part symmetry around the motor circumference, then identical coil-magnet relative configurations are achieved at increments of 1/12 and 1/14 rotation of the external rotor. This geometry is illustrated in FIG. 15. Higher frequency harmonics are also created by aligning various coil pairs in an identical fashion. An FFT of the torque data in FIG. 13b reveals sharp spikes at multiples of 12 and 14 times the rotor rotation frequency. Cogging presents an unwanted excitation frequency one decade removed from the target once-per-revolution input frequency used to excite cyclic control, and as a result produces well defined ripples in the output forces and moments and is likely deleterious to performance. However, the effect does not swamp out the desired behaviors. Both hardware and software alleviation options are available for future work.

The second observed behavior not present in the simple dynamic model is a large once per revolution oscillation in moment about the horizontal axes. This signature is present even when no input modulation is being applied and the photographic analysis confirms the propeller blade is rotating uniformly without feathering. Three plausible causes for this oscillation are a static imbalance, dynamic imbalance, or aerodynamic imbalance. A purpose built test stand for statically balancing propellers showed no imbalance sufficient to drive the magnitude of the observed moment. A possible cause of the observed imbalance is unintentionally asymmetric lift forces on the two blades even at the steady hover condition.

As mentioned previously, the rotor design allows for each blade to trim to equal angle of attack when the propeller is in the hover thrust condition. This balance is tuned by adjusting the pitch of each blade at the neutral angle to account for the steady deflection of the hinge in flight due to drag. Photographs of the propeller in flight appear to confirm that one blade generally adopts a more aggressive angle of attack than the other does, and so these deflection angles will need to be adjusted in future iterations. This imbalance does not affect the net control output of the propeller system as this steady turning moment is integrated symmetrically through every revolution—as a result, the preceding control sensitivity analysis is unaffected. However, this once per revolution perturbation swamps and disguises the force and moment waveforms generated from the interesting system dynamics. This unwanted effect is identical to a very high degree across every revolution of the blade, and so in the following moment plots of the fast dynamics, the steady imbalance oscillation has been subtracted for clarity.

Figure 16:
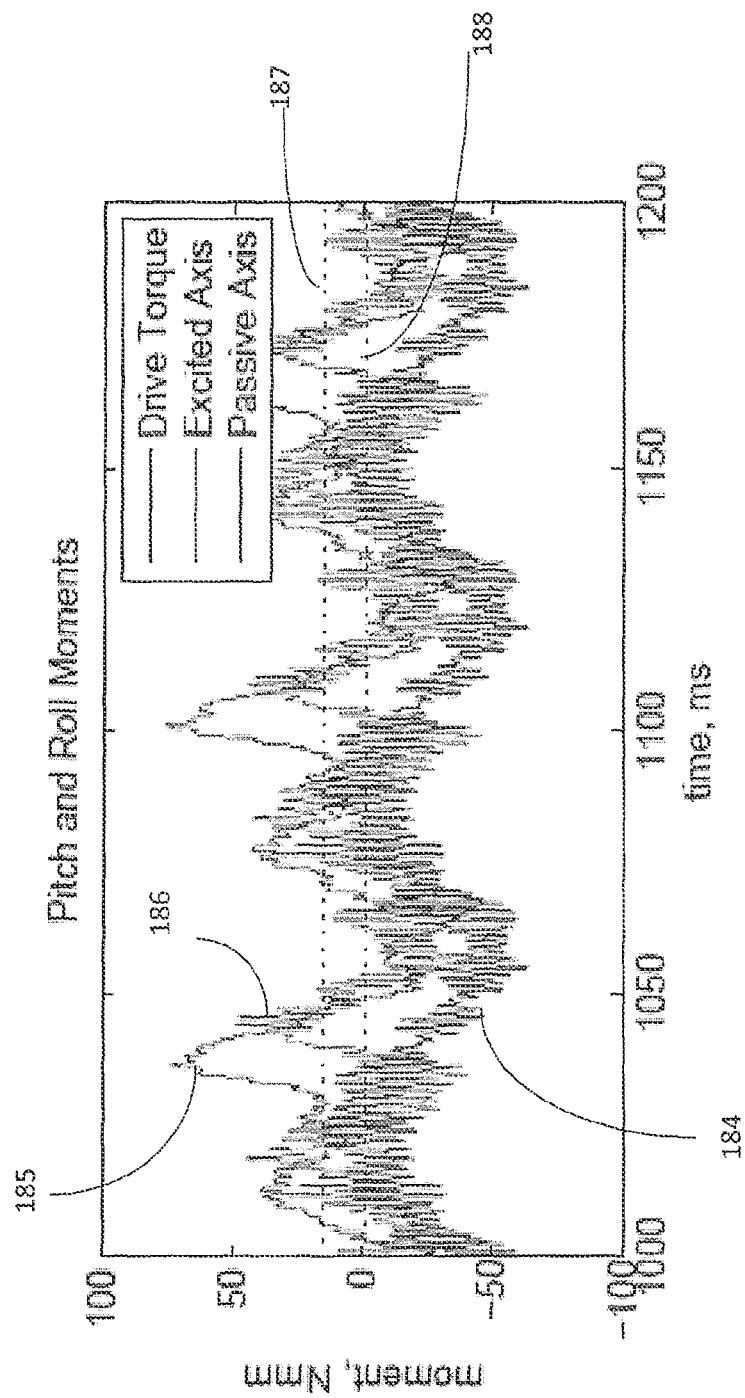
FIG. 16 shows motor torque and response moments.
Figure 17:
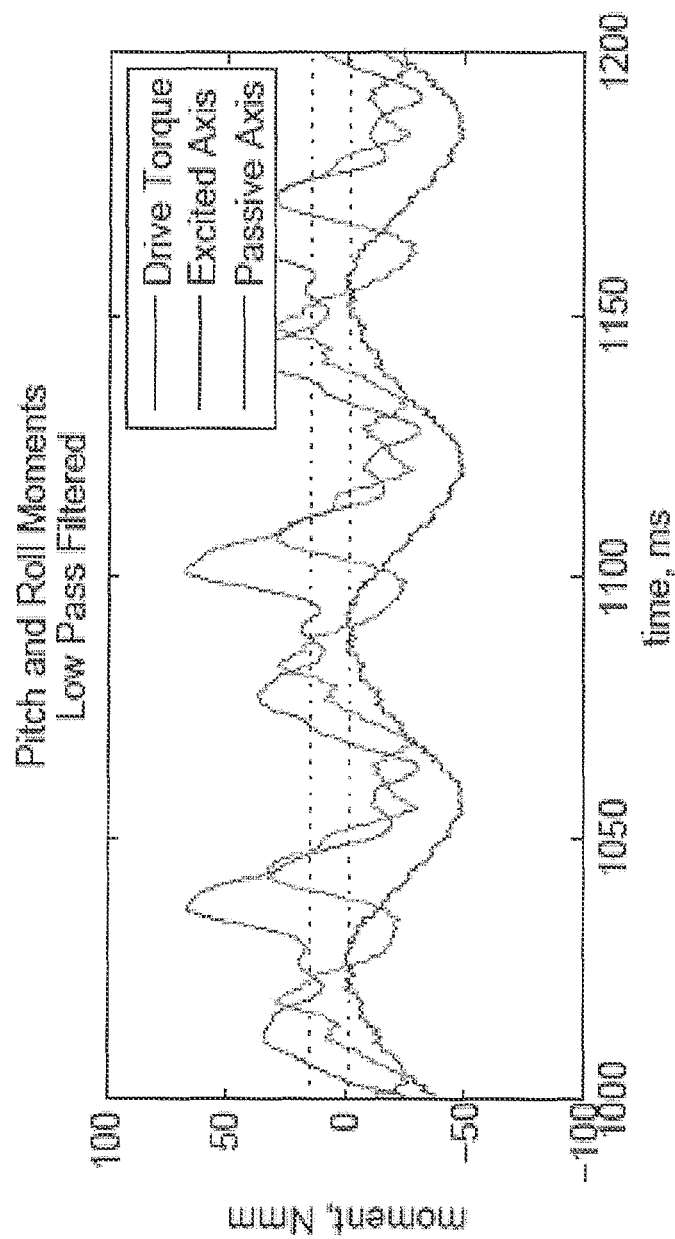
FIG. 17 shows low-pass filtered motor torque and response moments.

The moment response of the propeller system was measured in response to a driving oscillatory input voltage amplitude of 0.10 about a mean value of 0.35 pwm duty factor, corresponding to a rotor speed of 931 rpm. FIG. 16 illustrates the measured axial torque with line 184, the moment about the horizontal axis of maximum mean response with line 185, and the moment about the horizontal axis of minimum mean response with line 186. Dotted trend line 187 and dotted trend line 188 show the long term average moment about the passive axis is very nearly zero and the long term average moment about the excited axis is 14.6 Nmm, close to ½ the mean drag torque of the rotor. The cogging torque ripple is strongly represented in both the axial driving torque and the passive axis moment. In FIG. 17, the signals have been post processed with a low pass filter.

The low pass filtered results highlight the expected frequency doubling property of the propeller system, with peaks in the excitation moment corresponding to the passing of each of the two rotor blades. Major and minor peaks indicate that the two propeller blades are not contributing equally to the long term output moment.

Figure 18A:
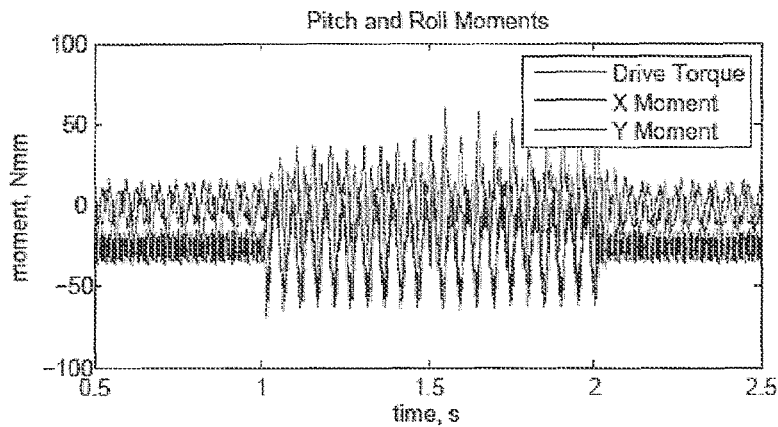
FIG. 18a shows a pitch and roll moments response to steps in magnitude and phase inputs for a hinged propeller.
Figure 18B:
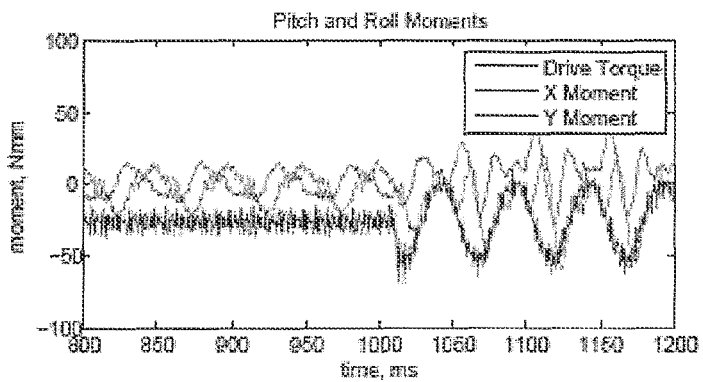
FIG. 18b shows a pitch and roll moments response to steps in amplitude inputs for a hinged propeller.
Figure 18C:
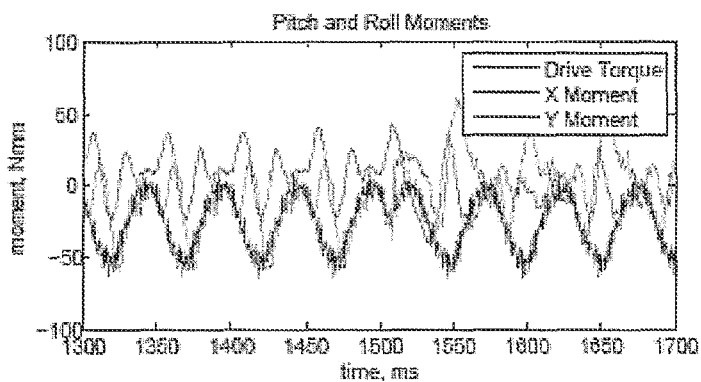
FIG. 18c shows a pitch and roll moments response to steps in phase inputs for a hinged propeller.

An implementation of the hinged propeller system in a free flight craft may call for rapid changes in commanded orienting moment magnitudes and directions. As a result, the transient response to fluctuating torque inputs and the steady state response sensitivities previously summarized in FIG. 9 are observed. The response to step inputs in commanded phase and magnitude are an indication of this type of performance. FIG. 18a, FIG. 18b, and FIG. 18c show the raw moment measurements associated with a series of steps in control input at a propeller velocity of 1192 rpm.

The initial commanded moments is zero with zero input oscillation, at t=1 the input oscillation amplitude steps to 0.1 pwm duty to command a moment about one axis, at t=1.5 the phase of input oscillation steps by 180 degrees to command a reversal in orienting moment direction, and at t=2 the commanded moment returns to zero. At each stage the output response waveform settled into the new driven limit cycle within one revolution of the propeller, consistent with a step input rise time of less than 50 ms. This is comparable to cyclic control helicopter craft which generate body moments through pitch reorientation in a similar way to the proposed hinged propeller system. Quadrotor systems, on the other hand, must generate variations in body moment by changing the thrust of each of propeller typically over several revolutions.

A coaxial or tandem helicopter equipped with the proposed articulated propeller would be capable of expressing the same general control authority as is associated with traditional helicopter swashplate systems or quadrotor platforms. At the same time, the weight and complexity of the aircraft can be reduced by eliminating two of the four actuators required by these platforms along with the mechanical structure of either helicopter swashplate mechanisms or long quadrotor support arms. In this investigation a simple dynamic model exposed the qualitative trends in control sensitivity to rotor geometry and rotor speed, showing that blade pitch oscillations could be generated by feasible torque modulation amplitudes. A physical realization displayed the predicted cyclic feathering motions under photographic scrutiny. Finally, force and torque measurements were used to assess both the steady control sensitivity to inputs and the fast dynamics at work in both the forced limit cycle motion and step response transients. Successful flight tests demonstrate that the magnitude of the available control authority is appropriate for this scale of craft.

Prior art mid-range helicopters incorporate a swashplate driven by auxiliary servos. However, economy servos do not have the bandwidth required to actively stabilize small helicopters and so these aircraft require an additional large passive flybar above the rotor for stability shown in FIG. 1 as BLH3111. This flybar increases their sensitivity to wind gusts, making outdoor flight difficult, and for toy model applications the flybar reduces the "authentic" appearance of the aircraft. The pulsing rotor control method disclosed herein has the bandwidth to achieve active stability, and so replacing the swashplate allows for the elimination of the flybar. At the same time, it can reduce the rotor drive complexity and maintain flight agility.

Unmanned aerial vehicles in military roles might benefit from simplified field maintenance or durability due to a reduction in moving parts. While cyclic control is typically associated with helicopters, the presented control method may also be applied to airplane or transitioning-flight systems which may then not require additional aerodynamic control surfaces.

Modeling aerodynamic forces into the dynamic model may allow for the numerical prediction of aerodynamic moments. The time constant of oscillation suggests quasi-static assumptions are valid for the calculation of the instantaneous aerodynamic forcing, and these forces may be applied to the rigid body blade as an external force and moment.

Several improvements to the electromechanical system are also possible. Smoother operation and possibly longer operational lifespans for such free flight craft may be achieved by reducing unwanted motor cogging torque fluctuations. Active electronic compensation for this torque ripple may be implemented for the motor controller driver. The available data also motivates iteration on the hinge inclination angle and the zero deflection blade pitch angles in order to achieve more uniform responses. An embodiment of the mechanical design comprises the substitution of living hinge flexures for pin hinge joints, with a monolithic and mass produce-able flexible propeller that expresses the desired cyclic behavior which results in a drive system with a fraction of the parts count found in contemporary designs. The hinges could be plastic flexures (like on a shampoo bottle cap) or possibly just appropriately flexible structures. Taken together, these improvements show a way towards cheap and robust MAV platforms that can support the same missions as present helicopter and quadrotor robotic systems.

Actuator bulk has become one of the defining challenges for emerging Nano Aerial Vehicle systems as they push towards the domain of hovering birds and large insects. The presented system may directly help make rotorcraft tenable at this scale, but the broader concept of multimodal actuator utilization through frequency separation may also help merge the thrust and control assemblies of today's smallest flapping fliers such as the AeroVironment Nano Hummingbird. Simultaneously reducing the size, cost, and complexity of MAV systems may further help realize a paradigm of single-use or otherwise 'expendable' robots. Such agents could be more suitable than their present expensive, overachieving counterparts for swarming and searching tasks where individual success is unlikely (needle in a haystack search) or impossible (corralling or team manipulation). Even in terrestrial robotics the innate compliance of modern engineered materials has gone from being an acceptable nuisance to a well utilized asset. Continued work integrating high bandwidth actuation with compliant or articulated mechanisms such as the present rotor hub may go even further to make flexible structures a key element of the overall actuation strategy, extending the breadth of accessible behaviors available from a restricted number of active elements.

Disclosed herein is a rotor control design for rotary wing micro air vehicles where a central hub is rigidly connected to the motor shaft and transmits torque to the rotor. Propeller blades are attached to the hub by hinges, where the axis of the two hinges lie parallel and co-planar to each other and the hub axis of rotation. The design causes a net positive balance of lift on the side of one blade when the hub is accelerating and a net negative balance of lift on that same blade when the hub is decelerating. By superimposing a sinusoidal driving torque on top of the steady driving torque needed to balance rotor drag, the blade pitch can be controlled in a very similar way to the current methods of a swashplate or additional servo actuators. A sinusoidal signal in phase with the rotor rotation entails: 1) the frequency of the sinusoid is the same as the rotation rate of the propeller, and 2) over multiple revolutions the peak of the sinusoid continues to correspond with the same orientation of the rotor. The direction of the vehicle response may be controlled by changing the phase of the sinusoid (e.g., changing the rotor orientation at which the sinusoid peaks.)

Also disclosed is a method of operation of such a propeller system. Typically, a single propeller pair attached via independent hinges to a rigid shaft can only achieve thrust from a single motor attached to the shaft and driven at a constant speed. The disclosed method adds a superimposed signal to the motor driver that can modify the moments acting on the propeller pair during a single revolution. By pulsing the motor speed in a specific manner, the propeller blades will act differently, causing the roll and pitch of the rotorcraft to be modified, in addition to the thrust. Thus, a single rotor controls 3 degrees of freedom. The fourth degree of freedom, yaw, can be controlled using traditional methods by adding a coaxial rotor controlled by a separate motor.

Figure 19:
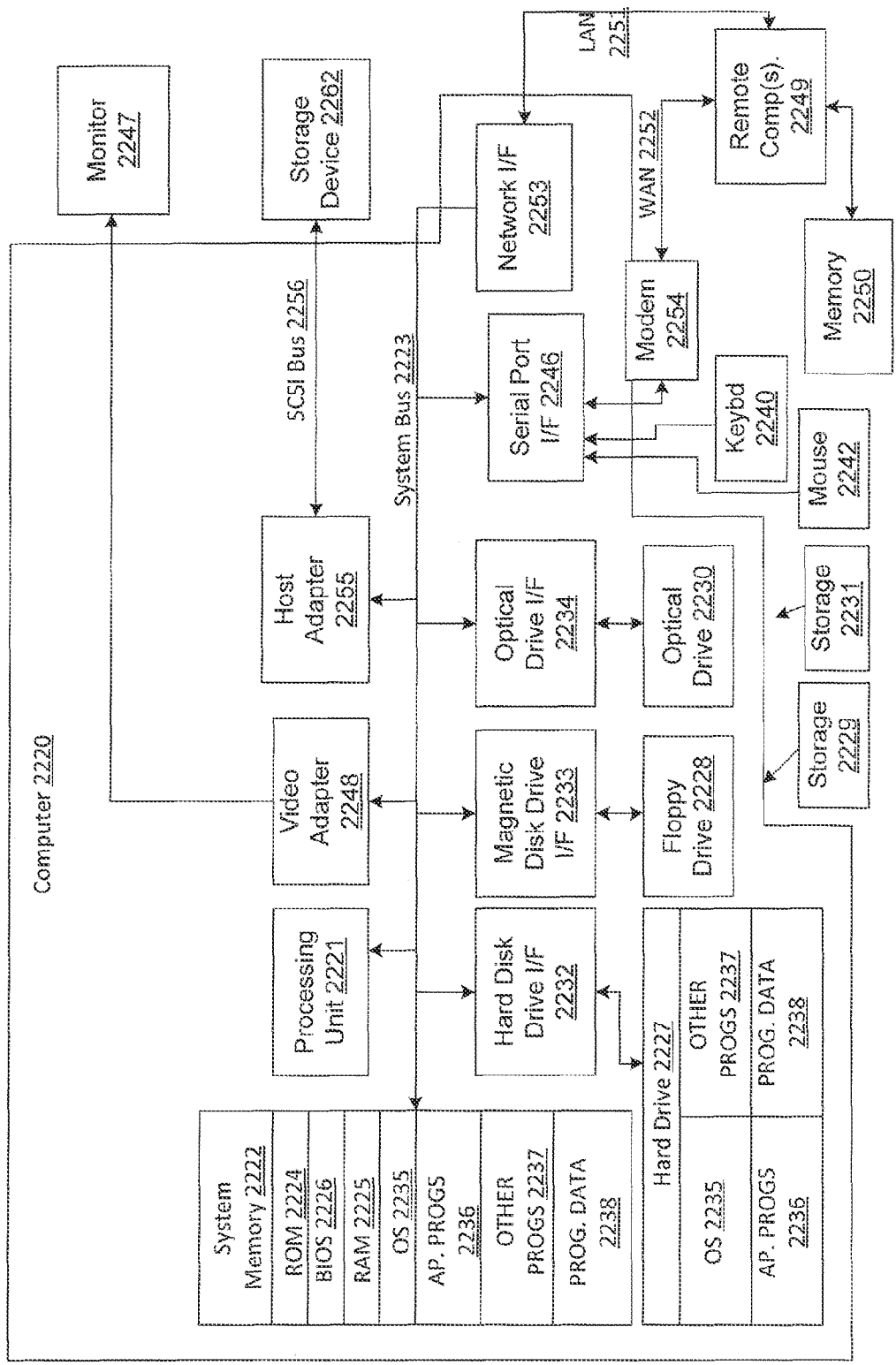
FIG. 19 is an exemplary block diagram representing a general purpose computer system in which aspects of the methods and systems disclosed herein or portions thereof may be incorporated.

FIG. 19 and the following discussion are intended to provide a brief general description of a suitable computing environment in which the control methods and systems disclosed herein and/or portions thereof may be implemented. Although not required, the methods and systems disclosed herein may be described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 19 is a block diagram representing a general purpose computer system in which aspects of the methods and systems disclosed herein and/or portions thereof may be incorporated. As shown, the exemplary general purpose computing system includes a computer 2220 or the like, including a processing unit 2221, a system memory 2222, and a system bus 2223 that couples various system components including the system memory to the processing unit 2221. The system bus 2223 may be any of several types of bus structures including a memory bus or memory controller, a peripheral bus, and a local bus using any of a variety of bus architectures. The system memory includes read-only memory (ROM) 2224 and random access memory (RAM) 2225. A basic input/output system 2226 (BIOS), containing the basic routines that help to transfer information between elements within the computer 2220, such as during start-up, is stored in ROM 2224.

The computer 2220 may further include a hard disk drive 2227 for reading from and writing to a hard disk (not shown), a magnetic disk drive 2228 for reading from or writing to a removable magnetic disk 2229, and an optical disk drive 2230 for reading from or writing to a removable optical disk 2231 such as a CD-ROM or other optical media. The hard disk drive 2227, magnetic disk drive 2228, and optical disk drive 2230 are connected to the system bus 2223 by a hard disk drive interface 2232, a magnetic disk drive interface 2233, and an optical drive interface 2234, respectively. The drives and their associated computer-readable media provide non-volatile storage of computer readable instructions, data structures, program modules and other data for the computer 2220. As described herein, computer-readable media is a tangible article of manufacture and thus not a signal per se.

Although the exemplary environment described herein employs a hard disk, a removable magnetic disk 2229, and a removable optical disk 2231, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 2229, optical disk 2231, ROM 2224 or RAM 2225, including an operating system 2235, one or more application programs 2236, other program modules 2237 and program data 2238. A user may enter commands and information into the computer 2220 through input devices such as a keyboard 2240 and pointing device 2242. Other input devices (not shown) may include a microphone, joystick, game pad, satellite disk, scanner, or the like. These and other input devices are often connected to the processing unit 2221 through a serial port interface 2246 that is coupled to the system bus, but may be connected by other interfaces, such as a parallel port, game port, universal serial bus (USB), a wireless interface such as Bluetooth, or the like. A monitor 2247 or other type of display device is also connected to the system bus 2223 via an interface, such as a video adapter 2248. In addition to the monitor 2247, a computer may include other peripheral output devices (not shown), such as speakers and printers. The exemplary system of FIG. 19 also includes a host adapter 2255, a Small Computer System Interface (SCSI) bus 2256, and an external storage device 2262 connected to the SCSI bus 2256.

The computer 2220 may operate in a networked environment using logical connections to one or more remote computers, such as a remote computer 2249. The remote computer 2249 may be a personal computer, a server, a router, a network PC, a peer device or other common network node, and may include many or all of the elements described above relative to the computer 2220, although only a memory storage device 2250 has been illustrated in FIG. 19. The logical connections depicted in FIG. 19 include a local area network (LAN) 2251 and a wide area network (WAN) 2252. Such networking environments are commonplace in offices, enterprise-wide computer networks, intranets, and the Internet.

When used in a LAN networking environment, the computer 2220 is connected to the LAN 2251 through a network interface or adapter 2253. When used in a WAN networking environment, the computer 2220 may include a modem 2254 or other means for establishing communications over the wide area network 2252, such as the Internet. The modem 2254, which may be internal or external, is connected to the system bus 2223 via the serial port interface 2246. In a networked environment, program modules depicted relative to the computer 2220, or portions thereof, may be stored in the remote memory storage device. It will be appreciated that the network connections shown are exemplary and other means of establishing a communications link between the computers may be used. Connections discussed herein may be wireless or wired.

Computer 2220 may include a variety of computer readable storage media. Computer readable storage media can be any available media that can be accessed by computer 2220 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2220. Combinations of any of the above should also be included within the scope of computer readable media that may be used to store source code for implementing the methods and systems described herein. Any combination of the features or elements disclosed herein may be used in one or more embodiments.

Modifications are possible within the scope of the invention. For example, the hinged rotor may be replaced with a monolithic flexible rotor, resulting in a drive system with only a tiny fraction of the parts count found in contemporary designs.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Although features and elements are described above in particular combinations, one of ordinary skill in the art will appreciate that each feature or element can be used alone or in any combination with the other features and elements. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An aerial vehicle comprising:
   a hub;
   a motor;
   a motor shaft connected with the motor and the hub;
   a rotor, wherein the motor shaft transmits torque to the rotor, wherein the torque of the motor is pulsed to generate control moments for the aerial vehicle; and
   a first propeller blade attached to the hub via a first hinge and a second propeller blade attached to the hub via a second hinge, wherein the first hinge and the second hinge are appropriately placed to help generate control moments.

2. The aerial vehicle of claim 1, wherein an axis of the first hinge and an axis of the second hinge are parallel with each other contained within a vertical plane containing an axis of the motor.

3. The aerial vehicle of claim 1, wherein an axis of the first hinge and an axis of the second hinge are skewed out of a plane to affect a coupling between lead-lag motion and flap motion in order to induce changes in aerodynamic angle of attack.

4. The aerial vehicle of claim 1, further comprising a flapping hinge, wherein the flapping hinge is connected between the hub and the first hinge or between the first hinge and the first propeller blade.

5. The aerial vehicle of claim 1, further comprising:
   a propeller blade attached to the hub, wherein the propeller blade is appropriately flexible to help generate control moments.

6. The aerial vehicle of claim 1, wherein the control moments are based on an estimate of a position of the rotor.

7. The aerial vehicle of claim 6, wherein the estimate of the position of the rotor is based on direct measurement using a high resolution magnetic encoder.

8. The aerial vehicle of claim 6, wherein the estimate of the position of the rotor is based on an output of an observer algorithm working on a measured motion of the aerial vehicle and commanded attitude corrections.

9. The aerial vehicle of claim 6, wherein the estimate of the position of the rotor is based on interpolating between once-per-revolution indexes from a device using timing.

10. The aerial vehicle of claim 6, wherein the estimate of the position of the rotor is based on interpolating between once-per-revolution indexes from a device using a known commutation speed of the motor of the aerial vehicle.

11. The aerial vehicle of claim 10, wherein the device is a mechanical device.

12. The aerial vehicle of claim 10, wherein the device is an optical device.

13. The aerial vehicle of claim 10, wherein the device is a magnetic device.

14. The aerial vehicle of claim 1, wherein the rotor comprises a first hinge with a first axis and a second hinge with a second axis, wherein the first axis is parallel with the second axis and asymmetrical about the center.

\* \* \* \* \*